Jan. 13, 1970          R. L. SCHUMANN ET AL          3,489,505
                         STERILIZING APPARATUS
Filed Aug. 28, 1967                                 4 Sheets-Sheet 4

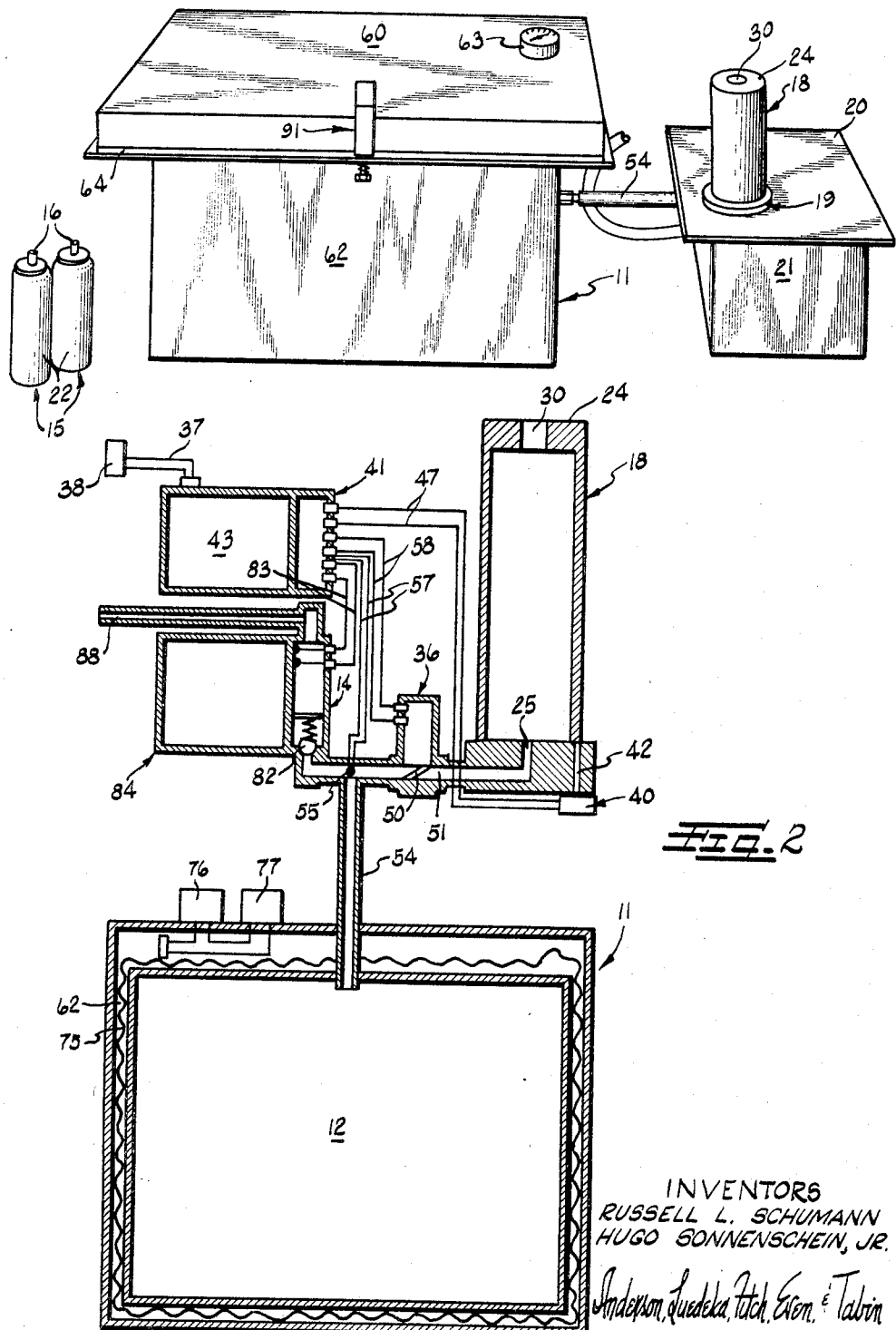

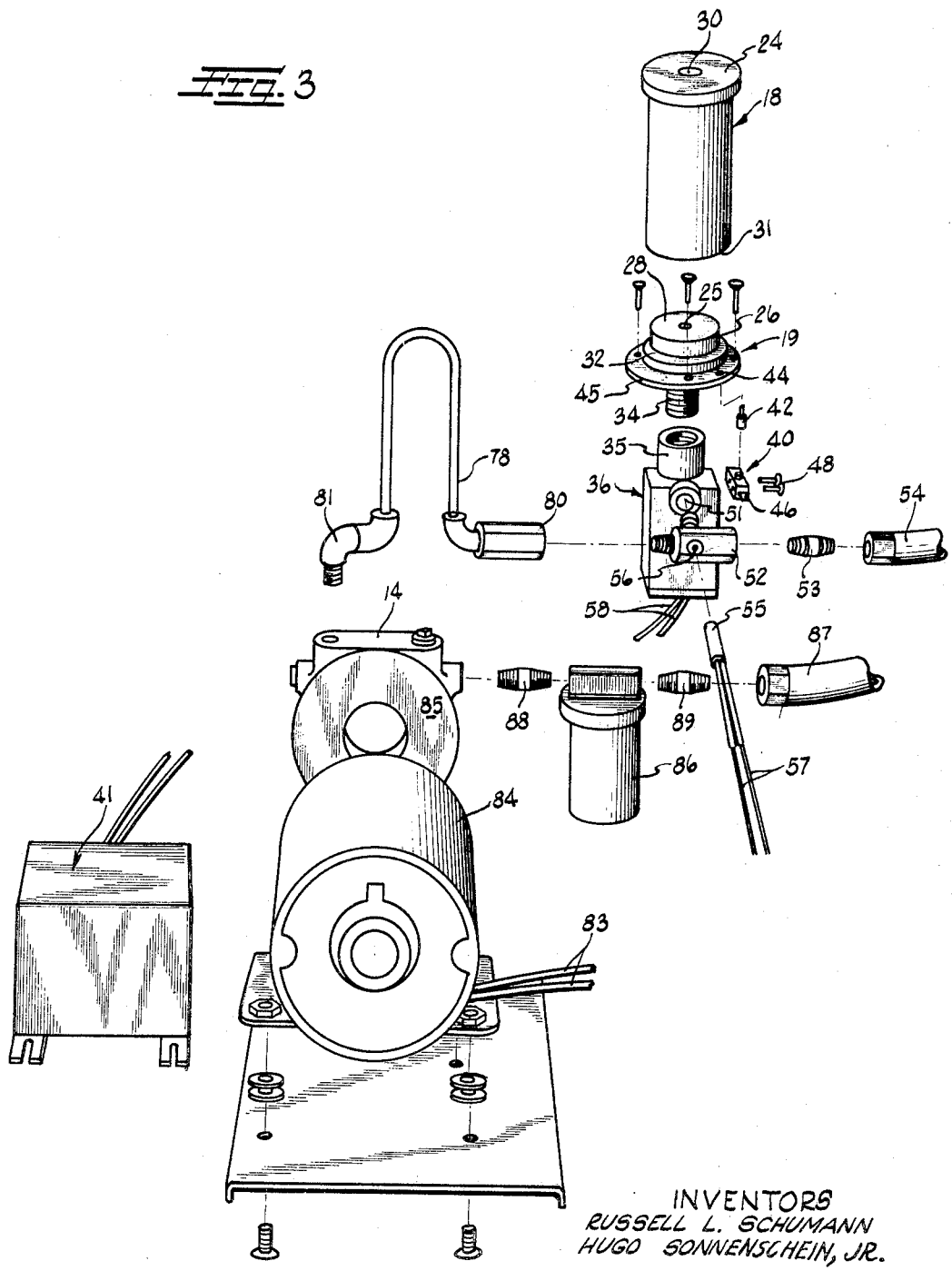

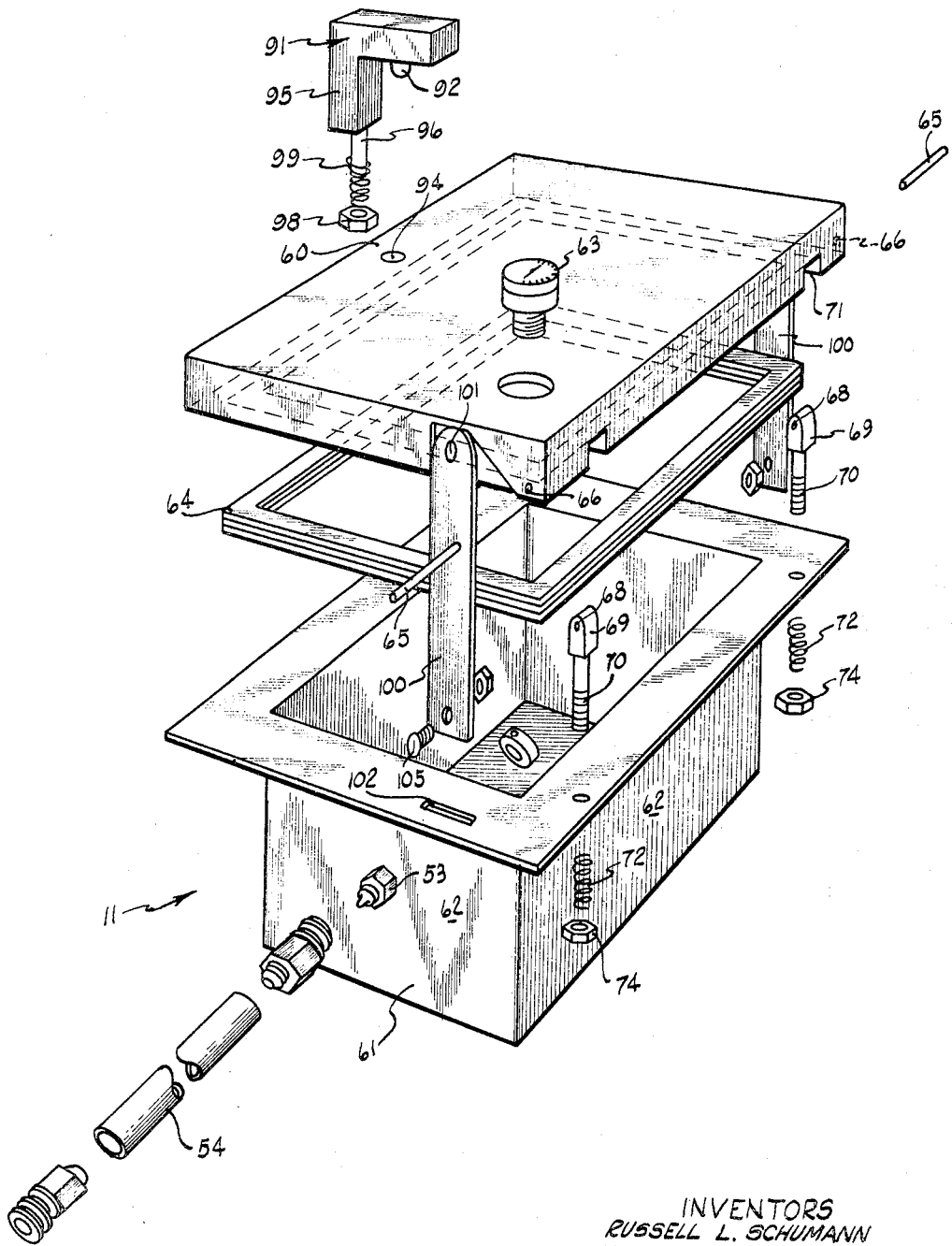

INVENTOR
HUGO SONNENSCHEIN JR.
RUSSELL L. SCHUMANN
BY Anderson, Luedeka, Fitch, Even, & Tabin
ATTORNEYS United States Patent Office 3,489,505
Patented Jan. 13, 1970

3,489,505
STERILIZING APPARATUS
Russell L. Schumann, Murray Hill, N.J., and Hugo Sonnenschein, 809 Lincoln, Winnetka, Ill. 60093; said Schumann assignor to said Sonnenschein
Continuation-in-part of application Ser. No. 592,127, Nov. 4, 1966. This application Aug. 28, 1967, Ser. No. 668,281
Int. Cl. A61l 3/00
U.S. Cl. 21—91                                9 Claims

ABSTRACT OF THE DISCLOSURE

A sterilization system including an apparatus for sterilizing articles within an enclosed chamber by a sterilizing gas such as ethylene oxide. Liquid ethylene oxide is automatically dispensed, flash evaporated into gas and introduced into the chamber. The rate of evaporation may be increased by subjecting the liquid to a pressure differential and supplying heat to the evaporating liquid. The entire system may be easily and quickly flushed to remove any residue of ethylene oxide.

---

This application is a continuation-in-part application of copending application Ser. No. 592,127 entitled, Sterilizing Method and Apparatus, filed Nov. 4, 1966, now abandoned.

This invention relates to a sterilization system and more particularly to a system in which a gas such as ethylene oxide is used to effect a microbicidal action on articles disposed within an enclosed chamber. Unlike steam sterilizers, such a system is of particular utility for sterilizing articles which are sensitive to high temperatures and moisture, for example, thermometers, catheters, rubber or plastic tubes, electronic analyzing equipment or the like.

A general object of the invention is to provide a system of the foregoing kind which, as contrasted with systems of the prior art is more economical and easily operated by relatively unskilled operators, and which is quicker by virtue of automatic controls and a fast generation of ethylene oxide gas.

A more specific object of the invention is to provide an improved apparatus for handling and generating a controlled atmosphere of ethylene oxide gas for a sterilizing chamber.

A further object of the invention is to provide a simple and efficient apparatus for delivering ethylene oxide to the sterilizing chamber and to flush the apparatus including the chamber with air to remove any residue of ethylene oxide.

Another object of the invention is to dispense liquid ethylene oxide from a replaceable cartridge and to use a heat and pressure differential to quickly flash the liquid to a gaseous state for introduction into the sterilizing chamber.

A further object of the invention is to provide a system employing only a single solenoid valve for controlling the flow of ethylene oxide and the flow of air for washing the system of ethylene oxide after a sterilization operation.

Other objects and advantages of the invention will be apparent from the following detailed description taken in connection with the accompanying drawings in which:

FIGURE 1 is a perspective view of a gas sterilization apparatus embodying the novel features of the present invention;

FIGURE 2 is a diagrammatic illustration of the operative connections between the operating elements of the sterilizing apparatus of FIGURE 1;

FIGURE 3 is an exploded perspective view of the operating elements in a control unit of the sterilizing apparatus of FIGURE 1;

FIGURE 4 is an exploded perspective view of the sterilizing chamber of the apparatus shown in FIGURE 1.

Figure 5:
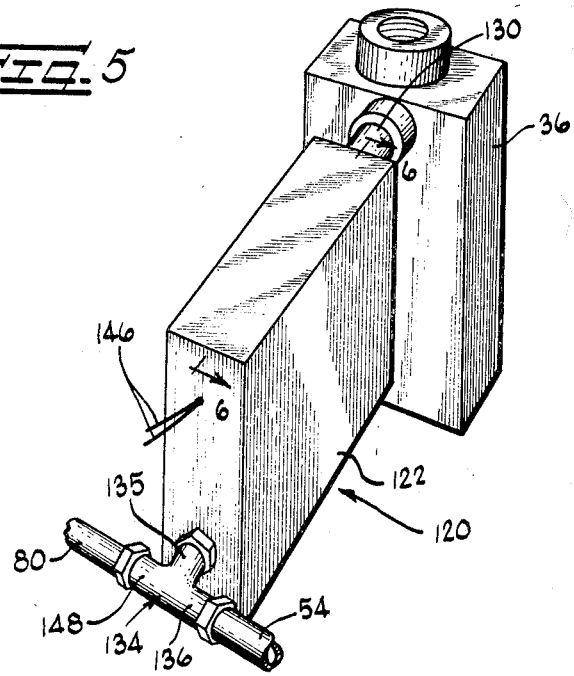
FIGURE 5 is a fragmentary perspective view of a heating element according to a further embodiment of the invention.

As shown in the drawings for purposes of illustration, the improved sterilization apparatus includes a housing 11 defining an enclosed chamber 12 which is adapted to receive the articles to be sterilized by a sterilizing gas such as ethylene oxide. This gas is well known as having an effective microbicidal action and as penetrating materials such as polyethylene which is impervious to ordinary atmosphere. To assist in penetration of the articles by the gas and to assure a better microbicidal action, the chamber, in the present instance, is first subjected to a partial vacuum to remove air prior to the introduction of the gas into the chamber.

According to the present invention, articles are sterilized by a method which includes the steps of: placing the article or articles into the chamber 12 which is then sealed and partially evacuated by operation of a pump 14 (FIGURES 2 and 3); dispensing ethylene oxide in the form of a liquid from a cartridge 15 (FIGURE 1) and subjecting the substance to a pressure differential and to heat causing the liquid to flash into a gas; after the formation of the gas, introducing the same into the chamber to sterilize the articles therein; and after sterilization of the articles by the gas, evacuating the gas from the chamber; passing air through the apparatus including the enclosed chamber and the valve through which the sterilizing gas passed to wash and to flush the gas away. By this method, the ethylene oxide is quickly evaporated into a sterilizing gas and an undesirable build up of the gas is avoided.

A convenient form in which to supply liquid ethylene oxide is the cartridge 15 which is of the aerosol type having a self-sealing valve 16 from which it will dispense approximately 90 grams of liquid ethylene oxide at a pressure of approximately 7 to 8 lbs. per sq. inch at room temperature, the pressure being furnished by a vapor pressure of ethylene oxide within the cartridge. Such cartridges are commercially available and will supply sufficient ethylene oxide gas for a chamber having a capacity of three cubic feet.

Prior to beginning a sterilization cycle, a removable housing 18 for receiving a cartridge 15 is unthreaded from an upstanding sleeve 26 on a base 19 secured on the outside of a top plate 20 (FIGURE 1) of a control unit or package 21. Then, an end 22 of the cartridge opposite the stem of the valve 16 is inserted endwise into the bore of the receiver housing toward an upper radial end wall 24 and the latter is again threaded on the base 19. The valve stem 16 projects downwardly and its orifice is aligned with a bore or opening 25 extending axially through the receiver base 19. The lower end of the valve stem is positioned on the upper end wall 28 of the base and over the bore 25 in the latter. With the receiver housing 18 telescoped over the cartridge with its top wall 24 bearing against the now upstanding end 22 of the cartridge, an aperture 30 in the top wall of the housing is blocked by the cartridge end 22. The aperture 30 serves as an air inlet when not blocked by the end 22 of the cartridge.

As the housing 18 is twisted and threaded onto the receiver base 19, the lower end 31 (FIGURE 3) of the housing moves into sealing engagement with an annular outwardly projecting collar 32 (FIGURE 3) formed on the sleeve 26 at the bottom of the external thread, and simultaneously the self-sealing stem of the valve 16 of the aerosol cartridge is forced upwardly in the cartridge and opens to allow the liquid ethylene oxide to flow downwardly from the cartridge into the vertical, internal bore 25 in the receiver base and then to flow down through a depending threaded cylindrical sleeve 34 (FIGURE 3) screwed into an upstanding sleeve 35 of a control valve 36. Thus, it will be seen that the valve stem is spring biased to a closed position and the top wall 24 forces the cartridge to move down relative to the stem on the base and thereby the valve is opened.

Simultaneously with the screwing down of the housing 18 and the release of the liquid ethylene oxide, a microswitch 40 is operated to begin operation of a control circuit including a timer mechanism 41 (FIGURE 2). The timer mechanism is a commercial available timer having a motor 43 (FIGURE 2) which is energized over leads 37 from a connection box 38 connected to a source of electricity for the control unit 21. An upstanding pin 42 on the microswitch extends through an opening 44 in an outwardly extending radial flange 45 on the receiver base 19 to be depressed by the rim 31 of the outer housing. The pin 42 is carried by a switch housing 46 fastened by screws 48 to a vertical side of the solenoid valve 36. The pin opens and closes contacts (not shown) which are connected to the timer mechanism 41 by leads 47 (FIGURE 2). Upon depression of the pin 42 and operation of the timer mechanism 41, the control circuit, which includes leads 58 extending to the valve 36, energizes a coil of a solenoid (not shown) disposed within the valve 36 and the solenoid moves its plunger to shift its valve element 50 (FIGURE 2) from a closed position blocking an internal bore 51 in the latter to an open position unblocking this bore. When the valve element 50 moves to its open position, the liquid ethylene oxide which is to the right of the valve element 50 is in communication with the chamber 12 of the housing in an inlet conduit which includes the bore passageway 51 in the valve, the passageway in a T fitting 52 (FIGURE 3), a connected passageway in a fitting 53 and a flexible hose 54 extending to the chamber 12.

According to the preferred manner of operation, the chamber 12 is already partially evacuated to a pressure of approximately 20 inches of mercury and a heater 55 is brought up to a high temperature when the solenoid valve 36 is energized to move its valve element 50 to permit the liquid ethylene oxide to be subjected to this pressure differential through the inlet conduit. Herein, the heater 55 (FIGURE 3) is provided in the inlet conduit to afford sufficient heat, at the pressure differential being experienced, to cause a flashing of all of the liquid into a gas, which then rapidly moves through the inlet conduit into the low pressure area in the evacuated chamber 12. Thus, the heater offsets the cooling of the liquid ethylene oxide during the evaporation process, which cooling, if allowed, retards the rate of evaporation. Heretofore, one common practice is to merely place liquid ethylene oxide on a pad within a chamber and to allow slow evaporation without heat, and another common practice is merely to place an open, elongated bottle containing liquid ethylene oxide within the chamber. The heater is in the form of an electrical, resistance heating element sized for press fitting into an open 56 on a side of the T fitting 52. Electrical leads 57 on the heater extend to the timer mechanism 41.

To facilitate the loading and unloading of articles within the chamber housing 11, the latter includes a hinged top cover 60 (FIGURE 4) for closing the upper end of a box-like body 61 having four side walls 62 connected to a bottom wall. The chamber 12 is thus defined by the side walls, bottom wall and top cover. A suitable pressure gauge 63 is inserted into an aperture in the cover to enable an operator to read the internal pressure in the chamber 12.

To provide an effective airtight seal between the cover and the box-like body, the cover 60 is formed with a peripheral magnetic type seal band 64 for fitting about a horizontal, peripheral flange on the cover and for releasably engaging a horizontal flange extending outwardly from and about the upper edges of the side walls. The cover is mounted for swinging movement by horizontal hinge pins 65 spaced at the opposite ends of a rear wall of the cover and inserted into bores 66 in the cover and into aligned bores 68 in the heads 69 of hinge members 70 fastened to the housing flange. The heads 69 extend upwardly from the horizontal flange and into vertical openings 71 in the cover to receive the horizontal hinge pins.

To increase the rate of microbicidal action, it is desirable to heat the enclosed chamber and, for this purpose, electrical resistance heater pads 75 (FIGURE 2) are disposed in a space in an insulating material placed between the double walls forming the side walls 62 for the chamber housing. The heating pads are connected to a thermostat 76 and a connection box 77 (FIGURE 2) secured to an outer side of one side wall of the housing. A source of electricity is connected to the junction box 77 herein to operate the heating pads independently of the control circuit and timer mechanism 41. The thermostat functions to maintain the temperature in the chamber at a desired set value which may be any temperature in the range of room temperature to 400° F. For items which are extremely heat sensitive, the thermostat is set to render the heater pads inoperative, and it has been found to require approximately a three hour sterilizing cycle at normal room temperatures. With the heater pads heating the chamber to approximately 140° F., it has been found that the typical cycle for sterilization can be reduced from three hours to approximately 48 minutes. Even though some heat may be employed, the process of the present invention is still considered by those in the art as a cold sterilization process, as contrasted with the hot sterilization systems using steam and commonly used in hospitals and other institutions.

While the principal agent for sterilization in this exemplary embodiment of the invention is ethylene oxide gas, if desired, radiation, steam or higher temperatures could also be employed in combination with the ethylene oxide gas to provide a sterilizing environment within the chamber.

To evacuate the chamber 12, the pump 14 communicates with the chamber through an outlet conduit comprising, in this instance, a sleeve 80 (FIGURE 3) threaded onto the left end of the T fitting 52, a flexible tubing 78 connected by an elbow fitting to the T fitting and by another elbow fitting to a further elbow 81 screwed into a port in a pump casing 85. A normally closed, spring biased check valve 82 (FIGURE 2) is disposed in the sleeve 80 to permit flow of air or gas in one direction only, which direction is to the pump, when the pump is operated to create a sufficient pressure differential to open the check valve. From the right hand portion of the T fitting, both the inlet and outlet conduits include a common portion constituted by the fitting 53 and the flexible hose 54. The vacuum pump is driven by a motor 84 fastened to a vertical end of the pump casing 85. The motor is connected by leads 83 to the timer mechanism 41 and is disposed on a plate 87 which is supported by vibration mounts resting on the bottom housing wall of the power package unit 21. The motor rotates the pump impellor to draw air or gas from the chamber through the exhaust conduit into the pump casing 85 and exhausts the air or gas through a muffler and filter unit 86 disposed intermediate the pump casing and a flexible outlet conduit 87. A fitting 88 is threaded into the outlet side of the pump casing and the inlet side of the muffler unit. A further fitting 89 is threaded into the outlet side of this unit and into a fitting on the exhaust tube 87.

The muffler and filter suppress noise and filter out any objectionable materials prior to discharging the ethylene oxide gas through the hose 87, which may lead to the ambient atmosphere outside of the room containing the sterilizing apparatus.

At the end of the sterilization period, a slight vacuum may still exist in the chamber and thus make it difficult to pivot open the top cover 60. To allow air into the chamber 12 to remove the vacuum, the door clamp 91 is pivoted to a release position and a rubber stopper 92 on an arm 93 of the clamp uncovers an air hole 94 in the cover 60. The door clamp is an inverted L-shaped member with a vertical leg 95 having a depending, integral pin 96 extending through a hole in the housing flange. The pin 96 is threaded at its lower end to receive a nut 98. A coiled compression spring 99 encircles the pin 96 and is disposed beneath the housing flange with its upper end engaging the latter and its lower end engaging the nut 98. The spring biases the lower end of the clamp leg 95 toward the upper side of the housing flange and holds the stopper 92 on the arm 93 at the hole 94 to seal the latter and also to clamp the cover against pivoting upwardly. By merely pulling up upon the clamp and then swinging it about a vertical axis, the clamping may be quickly moved between its respective clamping and unclamping position.

Herein, the swinging of the cover 60 towards its open position is limited by a pair of bands 100 pivoted at their upper ends by screws 101 and disposed in recesses in the vertical sides of the cover and extending down through openings 102 in the housing flange. With the cover closed, the bands are vertically disposed along side the vertical walls of the chamber housing and during pivoting of the cover to its open position the lower ends of the bands move upwardly through the openings 102 to bring stops 105 against the underside of the flange at openings. The stops are in the form of a nut on screws extending transversely through the lower ends of the bands, and disposed beneath the housing flange.

In this instance, the power package unit contains the entire control circuit which includes the timer mechanism 41 and its leads 47 to the switch 40, leads 58 to the solenoid valve 36, leads 57 to heater, and leads 83 to the pump motor 84. Also, the pump 14, valve 36 and heater 55 are all housed in the power package unit 21, which is suitable for use with a number of sizes of sterilizing chamber. For instance, the same power package 21 and aerosol cartridge 15 may be used with the hose 54 connected to a chamber 12 having a one, two or three cubic foot capacity. Thus, the same control circuit may be used with the three different sizes of chambers. The power package may be used separately from the housing 18, as for example, when the articles to be sterilized are in other chambers such as impervious plastic bags.

The operation of the control circuit and the sterilizing apparatus can best be understood from the following detailed description of an operation of the apparatus.

Articles are usually placed in sealed plastic bags such as polyethylene which is porous enough to admit the ethylene oxide gas through the bag walls. The bags are placed in the chamber 12 and the cover 60 is closed to render the chamber airtight. After an aerosol cartridge 15 has been disposed on the received base 19 and as the housing 18 is being screwed down toward the base, the pin 42 of the microswitch 40 is actuated to complete a circuit for the timing mechanism 41 which automatically resets and beings a cycle which is about five minutes in duration. The timer motor 43 causes operation of switches (not shown) a first of which operates the motor 84 for the vacuum pump 14 for a period of two minutes to produce a partial vacuum of about 20 inches of mercury within the chamber 12. Then the pump shuts down and another switch causes the heater 55 to energize for the remainder of the cycle, i.e. about three minutes. About thirty seconds after the heater has been energized, a further switch is closed to operate the solenoid valve 36 to pivot its valve member 50 to an open position. The solenoid valve 36 remains in the open position for about one minute and is de-energized and moves to its closed position for a period of forty-five seconds. During this forty-five seconds, the heater 55 recovers from the cooling effect of the vaporization of a portion of the liquid ethylene oxide and the heater comes back to peak temperature. Then, the solenoid valve 36 is again energized and moves to its open position for the remainder of the cycle, i.e. for a period of about one minute. At the end of the timer cycle, the solenoid valve 36 is de-energized as is the heater 55 and the timer motor 43.

When the solenoid valve 36 is in its open position the liquid ethylene oxide in the inlet conduit is immediately subjected to a pressure drop extending from the evacuated chamber to the valve member and to being heated by the heater 55 within the T 52. The top of the cartridge is blocking the entry of air, at this time, through the air inlet opening 30 at the top of the receiver housing. The heater supplies sufficient heat to prevent the lowering of the temperature of the liquid ethylene oxide to an extent which would retard the rate of evaporation. The heat supplied for the pressure drop being experienced is sufficient to cause a flash evaporation of the liquid into a gas, which then moves into the lower pressure area in the chamber 12 and results in a pressure in the chamber of approximately to four or five inches of mercury.

The ethylene oxide gas is now in the chamber and the operator leaves the articles within the sealed chamber in the presence of the ethylene oxide gas for as long as desired to complete the sterilization of the articles. Usually, the period of sterilization takes less than three hours. The operator may remove the spent cartridge any time after the gas generation cycle of five minutes as the closed solenoid valve 36 prevents loss of the gas through the inlet conduit and the check valve 82 prevents a loss of gas through the outlet conduit.

When the operator has decided that the sterilization period has ended, the operator, having removed the now empty cartridge, replaces the empty housing on the base to actuate the pin 42 and microswitch 40 to begin a new timer cycle. Immediately, the motor 84 and the vacuum pump 14 operate to withdraw the ethylene oxide gas from the chamber and exhaust the same through the pump 14 and muffler 89 and hose 87 for discharge to the ambient atmosphere. After two minutes, the pump shuts down and the timing mechanism energizes the heater and then the solenoid valve 41 which moves to the open position for two periods of one minute each. When the solenoid valve is open, air at ambient pressure is drawn through the air inlet opening 30 into the now empty cartridge housing and through the inlet conduit and the solenoid valve to bring the pressure in the chamber 12 to approximately ambient room pressure. A first wash cycle has now been completed and the inlet and outlet conduits as well as the solenoid valve and chamber have been washed of ethylene oxide by the purging air stream. A second air washing is usually employed. Thus, the receiver housing 18 is unscrewed and then screwed down to again actuate the microswitch 40 again. The vacuum pump 14 again operates and pulls the charge of washing air from the chamber 12 through the outlet conduit pump and muffler for discharge to the atmosphere. Then the timer mechanism again energizes the heater and opens the valve 36 for two periods of one minute each and air at ambient pressure moves through the inlet conduit to the chamber. Because of the tendency of ethylene oxide to penetrate porous surfaces, several of these wash cycles are preferred to assure the elimination of ethylene oxide from the entire system. During the wash cycle the ethylene oxide also exists through the pores of the polyethylene bags if they are employed. A slight vacuum may still be present in the chamber 12 after the wash cycles, and this vacuum is relieved when the operator lifts and swings the clamp 91 to unseat the stopper 92 from the air hole 94 in the cover 60. The cover 60 is swung open and the articles are removed.

Figure 6:
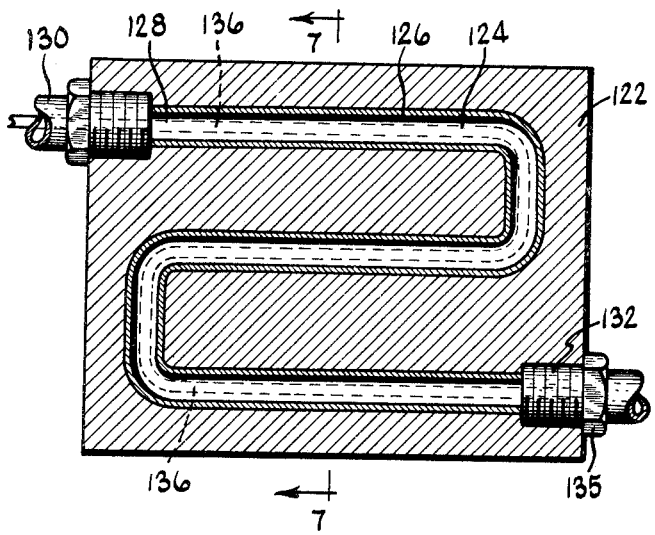
FIGURE 6 is a cross sectional view taken along the line 6—6 of FIGURE 5.
Figure 7:
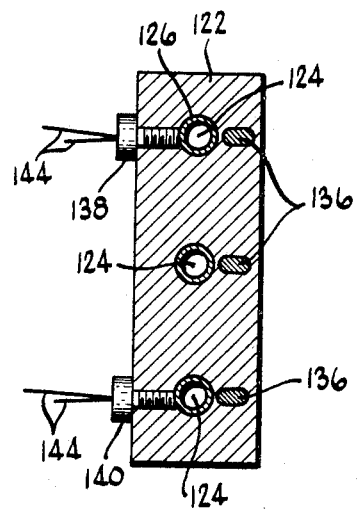
FIGURE 7 is a cross sectional view taken along the line 7—7 of FIGURE 6.

Another embodiment of the invention is illustrated in FIGURES 5, 6 and 7 to provide a quicker and more efficient flash evaporation of the liquid ethylene oxide into a gas. It will be recalled that in the above described embodiment of the invention that the valve 36 was closed for about 45 seconds during the evaporation of the liquid so that the heater 55 could recover from the cooling effect of the evaporation process. In this further embodiment of the invention, a heating means 120 provides a heat sink for supplying sufficient heat to evaporate the ethylene oxide without such a recovery period and the flow of air and gases are controlled in a manner to reduce the loss heat from the heating means.

To these ends, the heating means 120 is, in this instance, in the form of a large metallic block 122 of generally rectangular cross section with a relatively long internal hollow passageway 124 through which the ethylene oxide may flow and evaporate. The passageway 124 is the hollow interior of a generally Z-shaped metallic tube 126 molded, in situ, in the block 122 with an inlet end 128 threaded to receive a threaded sleeve 130 connecting the heating means to the discharge port of the valve 36. Thus, liquid ethylene oxide may flow from the valve 36 into the passageway 124 and begin to move toward a passageway outlet 132 which is threaded and connected to a T fitting 134 having one side 135 connected to the flexible hose 54 leading to the enclosed chamber 12.

To heat the metallic block 122, it is preferred to employ a generally Z-shaped metallic, electrical resistance heating element 136 (FIGURE 7) molded, in situ, adjacent the passageway 124 with the upper and lower legs of the heater element disposed parallel to the corresponding legs of the passageway. To determine the temperature at these upper and lower legs of the passageway 124, a pair of thermostats 138 and 140 are inserted into suitable bores 142 and extend from a sidewall of the block 122 to the tube 126 providing the passageway 124. Electrical leads 144 extend from the thermostats to a suitable control device for the heaters such as the timer mechanism 41. Likewise, suitable electrical leads 146 extend from the heating element 136 to a control device such as the electrical timer 41.

Preferably, the metallic block 122 is formed by molding a low melting temperature alloy into a block about the heater 136 and the tube 124. The block is dimensioned to store a sufficient, predetermined quantity of heat for transfer to the evaporating ethylene oxide so that the same will quickly and completely flash evaporate. By providing a thermostat control, the temperature in passageway can be controlled to reach and maintain a predetermined minimum temperature for fast evaporation. The long passageway provides a large surface area for heat transfer and the exposure of the liquid ethylene oxide for a sufficient time within the heat sink to assure vaporization of all the liquid.

Another important aspect of the invention is bypassing the exhaust gas and air about the heat sink means, and thereby reducing a possible heat loss due to a fluid flow through the heating means. More specifically, it will be recalled that in the embodiment of the invention of FIGURES 1–4, that during exhausting of the chamber 12, either ethylene oxide gas or air, moved through the T fitting 52 and flowed about the heater element 55 and then out the exhaust sleeve 80 and exhaust pump 14. In the present invention, the gas or air being exhausted from the enclosed chamber 12 flows through the hose 54 and the right hand passageway of the T fitting 134 and then straight through the fitting's left hand end 148 and its passageway to the exhaust sleeve 80 and pump 14. During exhausting of the chamber 12, the valve element 50 in the valve 36 is closed blocking fluid flow through the valve 36 and block 122 so that relatively little air will leave the heat sink block passageway 124 during the exhausting of either a gas or air from the enclosed chamber 12.

Preferably, this further embodiment of FIGURES 5, 6 and 7 operates in the same general manner as previously described except that it is possible to eliminate the 45 second recovery period during which the valve 36 was closed and the heating element 55 was operating to offset the previously cooling by the evaporating ethylene oxide. Thus, the valve 36 need open only once and may dispense all of the liquid ethylene oxide in the passageway 124 for evaporation. As a result of the heat available, a faster evaporation and a simplified timing mechanism 41 may be attained.

It will be apparent from the foregoing that the present invention affords a novel apparatus and method for handling ethylene oxide and for causing the rapid evaporation of liquid ethylene oxide. The preferred apparatus is extremely simple in that a single solenoid valve is employed and the ethylene oxide is flushed by air wash from that valve, all of the conduits, chamber and pump.

While a preferred embodiment has been shown in the drawings and described herein, it is not intended to limit the invention by such disclosures. Rather, it is intended to cover all modifications and alternative constructions coming within the spirit and scope of the invention as defined in the appended claims.

What is claimed is:

1. A sterilizing system for sterilizing articles by generating a sterilizing gas from liquid ethylene oxide dispensed from an aerosol cartridge comprising, the combination of,
   a covered chamber for receiving the articles and the sterilization gas,
   a detachable housing with an interior bore into which is telescoped the cartridge, said housing having an aperture adapted to be covered by the cartridge when disposed in the housing,
   a base for sealing attachment with the housing,
   inlet passageways from said base to the chamber to convey the ethylene oxide to the chamber, a valve in the inlet passageway for controlling the flow of liquid ethylene oxide,
   a pump for reducing the pressure within the chamber and the connected inlet passageways, and
   a control circuit circuit including a switch operated by attachment of the housing to the base for operating the valve and pump in timed sequence to subject the liquid to the reduced pressure in the chamber when a cartridge is in the housing and to return the pressure in the chamber to ambient pressure when a cartridge is no longer covering the aperture in the housing.

2. A sterilizing system for sterilizing articles comprising, the combination of, a chamber having an enclosed interior for receiving the articles,
   a pump for evacuating the interior of the chamber to achieve a partial vacuum therein,
   a receiver for supply cartridges containing a sterilizing medium such as liquid ethylene oxide,
   an inlet means including a passageway for receiving the sterilizing medium from the cartridge and conveying the same to the chamber,
   an exhaust means including a passageway for exhausting air or the sterilizing medium from the chamber,
   an air inlet connected to the inlet means for admitting air to wash the inlet and outlet passageways and the chamber of the ethylene oxide,
   means including valve means for selectively controlling the flow of air and ethylene oxide through the passageways and to and from the chamber, said last mentioned means also including an electrical control circuit, said receiver including a base and a housing removably attached to said base and having the air inlet therein which is adapted to be covered by a cartridge disposed in the housing, and a switch in said control circuit operated by attachment of said housing to said base to cause a cyclic operation of the pump and valve means.

3. A sterilizing system for sterilizing articles with a sterilizing gas evaporated from a liquid such as ethylene oxide comprising, the combination of, a chamber having an enclosed interior for receiving the articles, a vacuum pump for evacuating the interior of the chamber to achieve a partial vacuum therein, a conduit having an outlet passageway extending between said vacuum pump and said chamber, first valve means for closing said outlet passageway to flow therethrough when said chamber has been evacuated to achieve said partial vacuum, a receiver for supply cartridges containing a sterilizing medium, an inlet means including an inlet passageway for receiving the sterilizing medium from the cartridge and conveying the same to the chamber, an air inlet connected to the inlet means for admitting air to wash the inlet and outlet passageways and the chamber of said sterilizing medium, second valve means in said inlet passageway for controlling the flow through said inlet passageway from inlet means to said chamber, means providing a heat sink for supplying heat to said liquid as it evaporates, said heat sink being elongated and disposed in said inlet passageway and having an inlet connected in fluid communication with said second valve means and an outlet in fluid communication with said chamber through said inlet passageway, and control means including a timer for operating said means providing said heat sink for a predetermined time period which is significantly less than the period of sterilization, said control means operating said vacuum pump for a predetermined length of time to exhaust air from said chamber prior to sterilizing and for subsequently operating said second valve means to an open position to admit said sterilizing gas into said chamber, and then to a closed position to prevent the loss of gas from the chamber during sterilization, after sterilization said control means being operated to again open said second valve means and to again operate said pump to cause air to flow through and wash said second valve means of ethylene oxide.

4. The combination of claim 3 in which the inlet and exhaust outlet passageways have a common portion connected to the chamber, and in which said first valve means includes a check valve in the outlet passageway and said second valve means includes a solenoid controlled valve in the inlet passageway.

5. The combination of claim 3 in which said second valve means includes a solenoid valve for selectively opening and closing the inlet passageway, and in which a control means is provided for selectively operating the vacuum pump and solenoid valve at and for predetermined periods of time.

6. A sterilizing system for sterilizing articles comprising in combination:

a chamber enclosed to be relatively airtight for receiving articles to be sterilized, a vacuum pump, an exhaust conduit connecting said vacuum pump to said chamber to evacuate the interior of the latter to achieve a partial vacuum therein, a cartridge receiver for receiving a cartridge containing liquid ethylene oxide, means including an inlet conduit for directing the flow of ethylene oxide from the cartridge receiver to the chamber, a valve selectively operable to open and close the inlet conduit to flow of ethylene oxide therethrough, a heater for heating the liquid ethylene oxide while said means including said inlet conduit are subjected to the partial vacuum to expedite the change of ethylene oxide from a liquid state to a gaseous state, an air inlet in said cartridge receiver to admit air into said inlet conduit to wash the same of ethylene oxide, and control means for operating said vacuum pump for a predetermined period to exhaust air from said chamber prior to sterilizing and for subsequently operating said valve to an open position to admit said sterilizing gas into said chamber, after sterilization said control means operating said vacuum pump to exhaust the sterilizing gas from said chamber and to open said valve to permit air to flow through to clean same.

7. The combination of claim 6 in which a solenoid operates the valve, and in which the control means include a timer mechanism for operating the solenoid to open the valve and subject the liquid ethylene oxide to the reduced pressure within the chamber.

8. The combination of claim 6 in which a housing and a pivoted cover define said chamber, said cover having an opening therein through which air may go into the chamber, and a clamp for clamping said cover to close the chamber and to cover the air opening.

9. The combination of claim 8 in which a valve is provided in said exhaust conduit to selectively control the flow of gas through the vacuum pump.

References Cited

UNITED STATES PATENTS

| 1,114,880 | 10/1914 | Hall | 21—110 |
| 2,007,738 | 7/1935 | Baer | 21—58 |
| 2,122,853 | 7/1938 | Biggs | 21—109 XR |
| 2,134,924 | 11/1938 | Moon | 21—58 |
| 2,899,266 | 8/1959 | Gewalt et al. | 21—58 |
| 2,965,936 | 12/1960 | Kaye | 21—58 XR |
| 3,068,064 | 12/1962 | McDonald | 21—58 |
| 3,257,161 | 6/1966 | Kaye | 21—58 |

FOREIGN PATENTS 236,071 10/1961 Australia.

MORRIS O. WOLK, Primary Examiner

J. T. ZATARGA, Assistant Examiner

U.S. Cl. X.R.

21—58, 103, 110